(12) United States Patent
Lee et al.

(10) Patent No.: US 8,813,973 B2
(45) Date of Patent: Aug. 26, 2014

(54) APPARATUS AND METHOD FOR FILTERING A MATERIAL FROM A LIQUID MEDIUM

(75) Inventors: Chie Ying Lee, Fremont, CA (US); Ren Jianmin, Jiangsu (CN)

(73) Assignee: Fluid-Quip, Inc., Springfield, OH (US)

( * ) Notice: Subject to any disclaimer, the term of this patent is extended or adjusted under 35 U.S.C. 154(b) by 864 days.

(21) Appl. No.: 12/435,451

(22) Filed: May 5, 2009

(65) Prior Publication Data

US 2010/0012596 A1 Jan. 21, 2010

Related U.S. Application Data

(60) Provisional application No. 61/050,350, filed on May 5, 2008.

(51) Int. Cl.

| | |
|---|---|
| B01D 25/36 | (2006.01) |
| B01D 25/30 | (2006.01) |
| B01D 25/28 | (2006.01) |
| B01D 33/00 | (2006.01) |
| B04B 3/04 | (2006.01) |
| B04B 7/02 | (2006.01) |
| B04B 1/20 | (2006.01) |

(52) U.S. Cl.
CPC ............ *B01D 25/36* (2013.01); *B01D 33/0083* (2013.01); *B01D 25/30* (2013.01); *B01D 25/28* (2013.01); *B04B 3/04* (2013.01); *B04B 7/02* (2013.01); *B04B 2001/205* (2013.01)
USPC ........... 210/350; 210/367; 210/298; 210/374; 210/377; 210/378; 210/360.2; 210/402; 210/403; 210/404; 210/405; 210/85; 210/106; 210/117

(58) Field of Classification Search
None
See application file for complete search history.

(56) References Cited

U.S. PATENT DOCUMENTS 1,589,097 A * 6/1926 Behr .............................. 210/213
3,684,098 A 8/1972 Bentley et al.
(Continued)

FOREIGN PATENT DOCUMENTS

| EP | 0 933 470 | 8/1999 |
|---|---|---|
| WO | 97/04165 | 2/1997 |

OTHER PUBLICATIONS

Theophano Plaka; International Search Report and Written Opinion issued in related PCT patent application No. PCT/US2009/042802; Feb. 9, 2010; 13 pages; European Patent Office.

(Continued)

*Primary Examiner* — Krishnan S Menon
(74) *Attorney, Agent, or Firm* — Wood, Herron & Evans, LLP

(57) ABSTRACT

An apparatus for filtering a material from a medium includes a first housing having a wall with a plurality of openings formed therein, a conveyor disposed in the housing for moving the material therealong, and a conduit line communicating with the interior of the housing for supplying the medium to the apparatus. At least one of the first housing and the conveyor rotate relative to a central axis to direct the medium toward the wall so as to separate the material from the medium. A method for filtering a material from a medium includes supplying the medium to a first housing, spinning the medium within the housing, passing the medium through a wall of the housing to separate the material from the medium, moving the material along the housing, introducing a fluid into the material within the housing, and washing the material using the fluid.

29 Claims, 9 Drawing Sheets

(56) References Cited

U.S. PATENT DOCUMENTS

| | | | |
|---|---|---|---|
| 4,997,578 A * | 3/1991 | Berggren | 210/770 |
| 5,160,441 A * | 11/1992 | Lundquist | 210/781 |
| 5,186,834 A * | 2/1993 | Arai | 210/413 |
| 6,634,508 B1 | 10/2003 | Ishigaki | |
| 2005/0189287 A1 | 9/2005 | Lin et al. | |

OTHER PUBLICATIONS

Shara Atashi; Invitation to Pay Additional Fees issued in related PCT patent application No. PCT/US2009/042802; Oct. 7, 2009; 7 pages; European Patent Office.

* cited by examiner

APPARATUS AND METHOD FOR FILTERING A MATERIAL FROM A LIQUID MEDIUM

CROSS-REFERENCE TO RELATED APPLICATION

This application claims priority to U.S. provisional patent application Ser. No. 61/050,350 filed on May 5, 2008, the disclosure of which is expressly incorporated by reference herein in its entirety.

TECHNICAL FIELD

The invention relates to filtering a material from a liquid medium and, more particularly, to an apparatus and method for separating fiber from a slurry or other liquid medium during, for example, a corn wet mill process.

BACKGROUND

A wide range of industrial applications require a bulk material to be separated or isolated into several constituent parts through, for example, some type of filtration process utilizing a liquid medium. Once filtered, the separated constituent, and/or the remainder of the bulk material and liquid medium, may be further processed so as to result in one or more desired products. By way of example, various methods of producing alcohol from grain may require that the fibrous constituent of the grain be separated from the starch and/or other constituents of the grain. A corn wet milling process, for example, separates the fiber from the starch in corn and subsequently uses the starch to produce ethanol, which may be used in automobiles or other motor vehicles. Filtration processes that separate a constituent from a liquid medium are a step in other industrial applications as well. In this regard, the pulp and paper industry often requires the separation of fiber from a fibrous bulk material. Such filtration processes also exist in the textile manufacturing industry, the chemical industry (e.g., crystal formation applications), and other fields.

In a corn wet mill process, to facilitate separation of the various constituents of the corn, the corn is mixed with water to form a slurry having a relatively high percentage of water (e.g., 80% or higher). The fiber is then filtered from the slurry, which in addition to the water, contains starch and gluten constituents of the corn, and the slurry is further processed to produce ethanol. In the corn wet mill process, conventional devices for filtering the fiber from the starch-containing slurry may include pressure screen devices and paddle screen devices. Pressure screen devices direct the slurry to flow through a static screen under relatively high fluid pressure. The screen includes openings sufficiently sized so as to permit the water, starch and gluten (any other constituents smaller than the openings) to flow through the screen, but prevent the fiber from flowing therethrough, thus essentially filtering the fiber from the slurry. Paddle screen devices include a rotating paddle with a stationary drum including an outer wall configured as a screen. The rotation of the paddle directs the slurry toward the screened outer wall and essentially presses the slurry so as to force the water, starch and gluten through the screen while preventing the fiber from passing therethrough. The movement of the paddles relative to the drum loosens the fiber from the outer wall and reduces plugging of the screen openings.

After initially filtering the fiber from the slurry, some of the starch and/or gluten may still be associated with the fiber. Thus, it may be desirable to wash the fiber and remove additional amounts of starch and/or gluten therefrom. In this regard, the fiber is typically mixed with a liquid medium, such as wash water, and directed back through a pressure or paddle screen device to separate the fiber from the wash water, which contains the additional starch and/or gluten washed from the fiber. Conventional systems may include multiple washing stages to remove the starch and/or gluten from the fiber. For example, processing systems utilizing pressure or paddle screen devices typically include six or seven such stages. These various stages typically include separate, dedicated devices to facilitate washing of the fiber with wash water, which is then directed to a pressure screen or paddle screen device for filtration of the fiber therefrom.

Although such systems operate for their intended purpose, these systems have several drawbacks. For example, the washing of the fiber in these systems is typically inefficient, therefore requiring a relatively large number of stages. This, in turn, increases the cost of the systems due to the large number of devices required (i.e., washing devices and/or pressure/paddle screen devices for filtration), increases capital and/or operating costs, and increases maintenance costs for those devices. Additionally, the relatively large number of stages also requires a significant amount of floor space in a manufacturing facility, which may be at a premium in various industrial applications. Furthermore, the above systems are prone to plugging and significant down time. For example, pressure screen systems generally require a high pressure washing about every eight hours of operation so as to function adequately.

Accordingly, there is a need for an improved apparatus and method for filtering a material, such as fiber, from a slurry or other liquid medium in a more efficient manner.

SUMMARY

To address these and other drawbacks in conventional filtration systems, in one embodiment, an apparatus for filtering a material from a medium includes a first housing having at least one wall with a plurality of openings formed therein, a conveyor disposed in the first housing for moving at least the material therealong, and at least one conduit line in fluid communication with the interior of the first housing for supplying the medium to the apparatus. At least one of the first housing and the conveyor rotate relative to a central axis so as to direct the medium toward the at least one wall so as to separate the material from the medium.

A second housing may be provided substantially surrounding the first housing and adapted to collect the medium that passes through the openings in the wall of the first housing. Additionally, the second housing may include at least one interior panel that effectively compartmentalizes the second housing into a plurality of zones. In one embodiment, the first housing includes a first section having a generally conical shape and a second section having a shape of a right cylinder. In another embodiment, the first housing may also have a third section having a generally conical shape. The first section and/or the third section may extend between approximately 10% and approximately 30% of the length of the first housing. The apparatus may include a motor operatively coupled to the first housing for rotating at least one of the first housing and the conveyor, and a controller operatively coupled to the motor for controlling the rotational speed of at least one of the first housing and the conveyor. The apparatus may further include a gear mechanism for allowing the first housing to rotate at a rotational speed different than the conveyor. Rotation of these components provides a G force between approximately 100 G and approximately 4,000 G at the wall of the first housing. Additionally, the length to diameter ratio of the apparatus may be between approximately 1 and approximately 10.

In one embodiment, the conveyor may be configured as an auger having a first end, a second end, a side wall extending therebetween, and at least one helical thread extending from the side wall. In a further embodiment, the auger includes a plurality of threads extending for at least a portion of the length of the auger. Additionally, the pitch of the at least one helical thread may vary along the length of the auger. In yet another embodiment, at least a portion of the side wall of the auger includes a plurality of openings that allow fluid to pass therethrough.

In another embodiment in accordance with an aspect of the invention, an apparatus for filtering a material from a medium and washing the material includes a single housing having at least a first zone and a second zone. The first zone is configured for separating the material from the medium and the second zone is configured for washing the material with a fluid introduced into the second zone of the housing. The apparatus may further include a third zone. The third zone may be another washing zone for washing the material with a fluid introduced into the third zone; a de-watering zone for removing additional fluid from the material; a compacting zone for compacting the material (i.e., so as to have a smaller volume) and removing additional fluid therefrom; and a drying zone for gas drying the material using a heated fluid such as air.

A method for filtering a material from a medium includes supplying the medium to a first housing, spinning the medium within the housing, passing the medium through a wall of the first housing to separate the material from the medium, moving at least the material along the first housing, introducing a fluid into the material within the first housing, and washing the material using the fluid. The method may further include collecting the medium that passes through the wall of the first housing. Additionally, the fluid introduced into the first housing may be filtered from the material.

In one configuration, a second housing is provided and is compartmentalized into a plurality of zones. A first zone includes at least the supplying step, spinning step, and passing step. A second zone includes at least the introducing step, washing step and filtering step. A third zone may be provided and may include de-watering the material, compacting the material, and/or drying the material using a heated gas, such as air. In one embodiment, the introducing step and washing step may be repeated one or more times. In such an embodiment, a counter current washing method may be used. In a further embodiment, the material collected in the first housing may be used as a filter to separate a second material (which may be the same as the first material but have, for example, a smaller size) from a second medium.

In yet another embodiment, a method for processing a material from a medium includes separating the material from the medium within a single housing, and washing the material in the housing.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Virtually all of the fuel ethanol in the United States is produced from a wet mill process or a dry grind ethanol process. Although virtually any type and quality of grain can be used to produce ethanol, the feedstock for these processes is typically a corn known as "No. 2 Yellow Dent Corn." The "No. 2" refers to a quality of corn having certain characteristics as defined by the National Grain Inspection Association, as is known in the art. "Yellow Dent" refers to a specific type of corn as is known in the art. Sorghum grain is also utilized to a very small extent. Generally speaking, the current industry average for ethanol yield for both dry grind and wet mill plants is approximately 10.2 liters (approximately 2.7 gal) of ethanol produced per 25.4 kg (one (1) bushel) of No. 2 Yellow Dent Corn.

Figure 1:
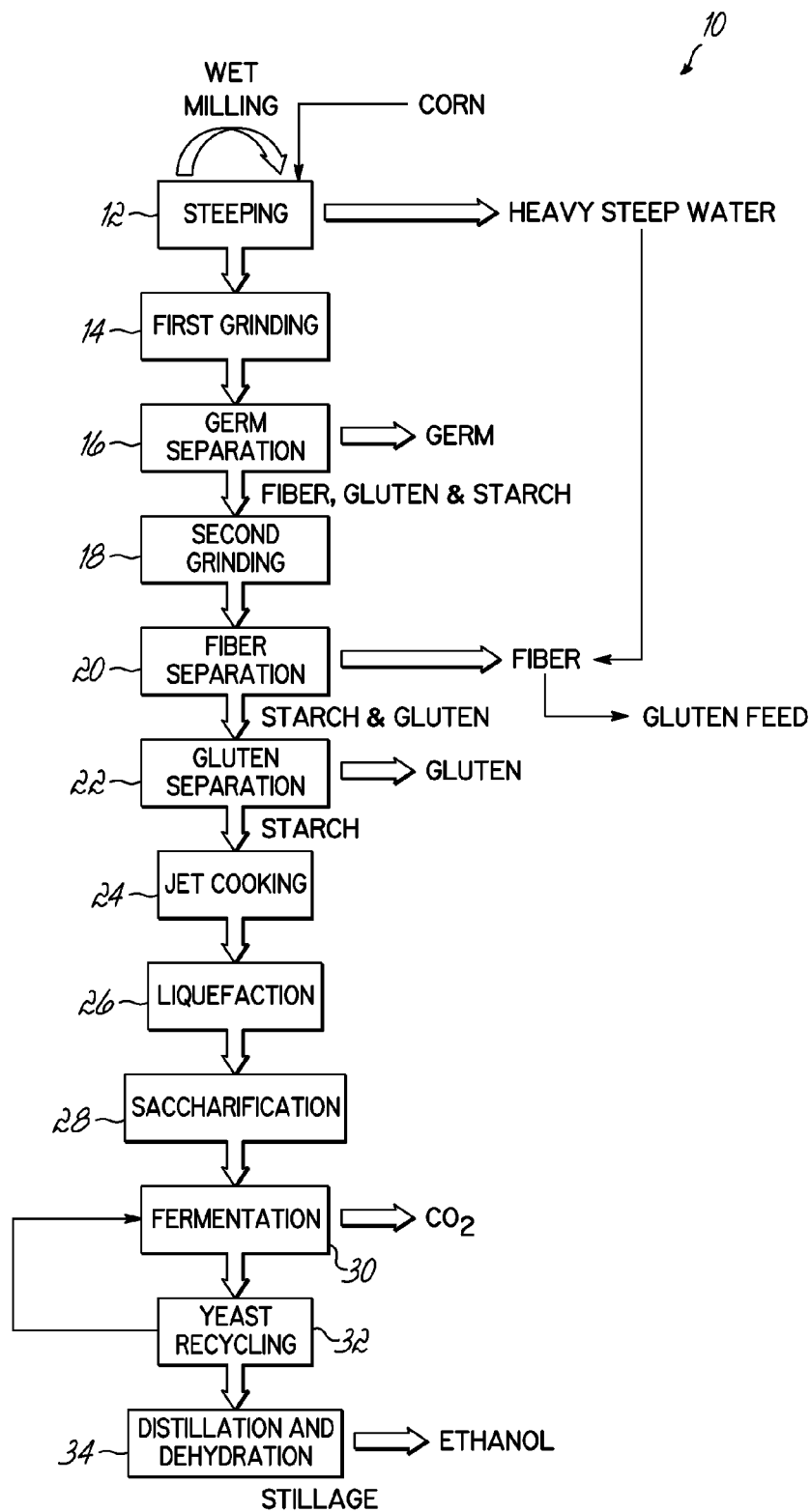
FIG. 1 is a flowchart illustrating an exemplary corn wet mill process for producing ethanol.

Corn wet mill processing plants convert corn grain into several different co-products, such as germ (for oil extraction), gluten feed (high fiber animal feed), gluten meal (high protein animal feed), and starch-based products such as ethanol, high fructose corn syrup, or food and industrial starch. FIG. 1 is a flow diagram of an exemplary wet mill ethanol production process 10. The process 10 begins with a steeping step 12 in which the corn is soaked for 24 to 48 hours in a solution of water and sulfur dioxide in order to soften the kernels for grinding, leach soluble components into the steep water, and loosen the protein matrix with the endosperm. The mixture of steeped corn and water is then fed to a degermination mill step (first grinding) 14 in which the corn is ground in a manner that tears open the kernels and releases the germ. This is followed by a germ separation step 16 that occurs by flotation and use of a hydrocyclone.

The remaining slurry, which is now devoid of germ, but containing fiber, gluten (i.e., protein) and starch, is then subjected to a fine grinding step (second grinding) 18 in which there is total disruption of endosperm and release of endosperm components, namely gluten and starch, from the fiber. This is followed by a fiber separation step 20 in which the slurry is passed through a series of screens in order to separate the fiber from starch and gluten, and to wash the fiber clean of gluten and starch. This is followed by a gluten separation step 22 in which centrifugation or hydrocyclones separate starch from the gluten.

The resulting purified starch co-product then undergoes a jet cooking step 24 to gelatinize (solubilize) the starch. Jet cooking refers to a cooking process performed at elevated temperatures and pressures, although the specific temperatures and pressures can vary widely. Typically, jet cooking occurs at a temperature of about 120 to 150° C. (about 248 to 302° F.) and a pressure of about 8.4 to 10.5 kg/cm² (about 120 to 150 lbs/in²), although the temperature can be as low as about 104 to 107° C. (about 220 to 225° F.) when pressures of about 8.4 kg/cm² (about 120 lbs/in²) are used. This is in contrast to a non-jet cooking process, which refers to a process in which the temperature is less than the boiling point, such as about 90 to 95° C. (about 194 to 203° F.) or lower, down to about 80° C. (176° F.). At these lower temperatures, ambient pressure would be used.

This is followed by a liquefaction step 26 at which point alpha-amylase may be added. Liquefaction occurs as the mixture, or "mash" is held at 90 to 95° C. in order for alpha-amylase to hydrolyze the gelatinized starch into maltodextrins and oligosaccharides (chains of glucose sugar molecules) to produce a liquefied mash or slurry. This is followed by separate saccharification and fermentation steps, 28 and 30, respectively. In the saccharification step 28, the liquefied mash is cooled to about 50° C. and a commercial enzyme known as gluco-amylase is added. The gluco-amylase hydrolyzes the maltodextrins and short-chained oligosaccharides into single glucose sugar molecules to produce a liquefied mash. In the fermentation step 30, a common strain of yeast (*Saccharomyces cerevisae*) is added to metabolize the glucose sugars into ethanol and $CO_2$. Saccharification can take as long as about 50 to 60 hours. Upon completion, the fermentation mash ("beer") will contain about 17% to 18% ethanol (volume/volume basis), plus soluble and insoluble solids from all the remaining grain components. Yeast can optionally be recycled in a yeast recycling step 32. In some instances, the $CO_2$ is recovered and sold as a commodity product.

Subsequent to the fermentation step 30 is a distillation and dehydration step 34 in which the beer is pumped into distillation columns where it is boiled to vaporize the ethanol. The ethanol vapor is condensed in the distillation columns, and liquid alcohol (in this instance, ethanol) exits the top of the distillation columns at about 95% purity (190 proof). The 190 proof ethanol then goes through a molecular sieve dehydration column, which removes the remaining residual water from the ethanol, to yield a final product of essentially 100% ethanol (199.5 proof). This anhydrous ethanol is now ready to be used for motor fuel purposes. The "stillage" produced after distillation and dehydration 34 in the wet mill process 10 is often referred to as "whole stillage." Other wet mill producers, however, may refer to this type of stillage as "thin stillage."

Figure 2:
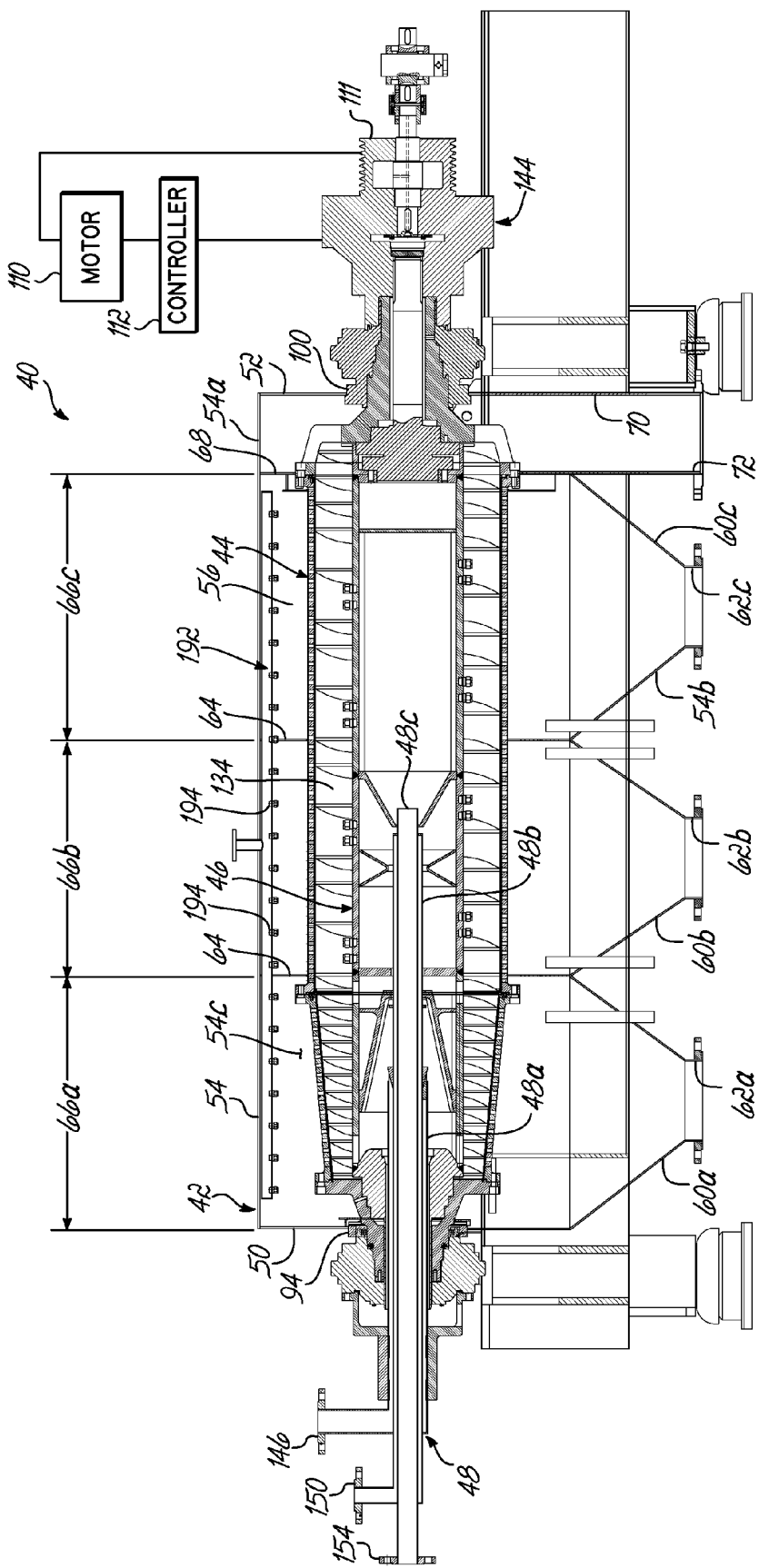
FIG. 2 is a cross-sectional view of a filtration centrifuge in accordance with one embodiment of the invention.

As noted above, the corn wet mill process 10 as described above includes a fiber separation step 20 wherein fiber is filtered or separated from the slurry. In accordance with an embodiment of the invention, an apparatus for achieving the filtration of the fiber from the slurry is shown in FIG. 2. The apparatus, referred to as filtration centrifuge 40, is a single, self-contained device that may be configured to perform both the initial filtering (sometimes referred to as a pre-concentration) of the slurry and washing of the fiber so as to clean the fiber and remove additional starch/gluten that remains associated with the fiber after the initial filtration or pre-concentration.

The washing of the fiber may include a washing cycle, wherein the fiber is mixed and rinsed in wash water, followed by a de-watering cycle, wherein the wash water is separated from the fiber. The washing of the fiber may include multiple rinsing/de-watering cycles. Additionally, a counter current washing technique may be employed to save wash water usage. After washing the fiber, but before the fiber exits the centrifuge, the fiber may go through an enhanced de-watering stage, a compaction stage, and/or an air dry stage to further de-water or dry the fiber. This may save the dryer capacity or eliminate the dryer altogether. In reference to FIG. 2, and in one exemplary embodiment, the filtration centrifuge 40 includes an outer housing 42, a generally tubular inner housing or basket 44 (filtration screen) substantially disposed in the interior of outer housing 42, a conveyor 46 generally coaxially disposed in the basket 44, and a plurality of conduit lines 48 generally coaxially disposed in conveyor 46 and adapted to receive the slurry and wash water therethrough.

The outer housing 42 includes a first end wall 50, a second end wall 52 opposite and spaced from the first end wall 50, and at least one side wall 54 connecting the first and second end walls 50, 52 so as to define an interior 56. The outer housing 42 may have any suitable shape. For example, in one embodiment, the outer housing 42 may be generally rectangular including an upper side wall portion 54a, a lower side wall portion 54b, and a pair of lateral side wall portions 54c (one shown in FIG. 2) extending therebetween. The use of descriptive terms upper, lower, and lateral for the side walls 54 are used to facilitate the description of the filtration centrifuge 40 and should not be construed to limit the centrifuge 40 to any particular orientation. As shown in FIG. 2, the lower side wall portion 54b may include a plurality of panels that collectively define one or more (three shown in FIG. 2) funnel-shaped hoppers 60a, 60b, 60c, each hopper having a corresponding outlet 62a, 62b, 62c. As discussed in more detail blow, a multi-hopper configuration provides for collection of the slurry (minus the fiber) in the pre-concentration stage and the wash water in the washing stages (and from the wash water in the enhanced de-watering stage and compaction stage if such stages are utilized). The multi-hopper configuration also provides for a counter current wash water technique to be utilized.

The outer housing 42 further includes one or more interior panels 64 that generally compartmentalize the filtration centrifuge 40 into a plurality of zones 66. For example, and as explained in more detail below, the panels 64 may generally define a pre-concentration zone 66a and one or more washing zones 66b, 66c (two shown in FIG. 2). Although two washing zones are illustrated in FIG. 2, those of ordinary skill in the art will appreciate that the number of washing zones may be application specific. For example, in the corn wet mill process described above, it is contemplated that between one and six washing zones, and preferably between two and four washing zones, may be included in the filtration centrifuge 40. More zones, however, are considered to be within the scope of the invention. In addition to the above panels 64 and corresponding zones 66, an interior panel 68 adjacent the second end 52 of the outer housing 42 also defines an exit chute 70 including an outlet 72 for receiving the filtered and washed material (e.g., fiber) processed by filtration centrifuge 40.

As mentioned above, and as illustrated in FIGS. 2 and 3, the basket 44 is disposed in the interior 56 of outer housing 42 and includes a first end 74 defined by a first hub 76, a second end 78 defined by a second hub 80, and at least one side wall 82 extending between the first and second ends 74, 78 and coupled to the first and second hubs 76, 80. While the basket 44 may have any suitable shape, in one embodiment, the basket 44 may be generally cylindrical and have a generally circular cross-sectional shape characterized by a basket diameter $D_b$. In one embodiment, the basket diameter $D_b$ may be substantially constant along the length of the basket 44 (e.g., right circular cylinder) (not shown).

Figure 3:
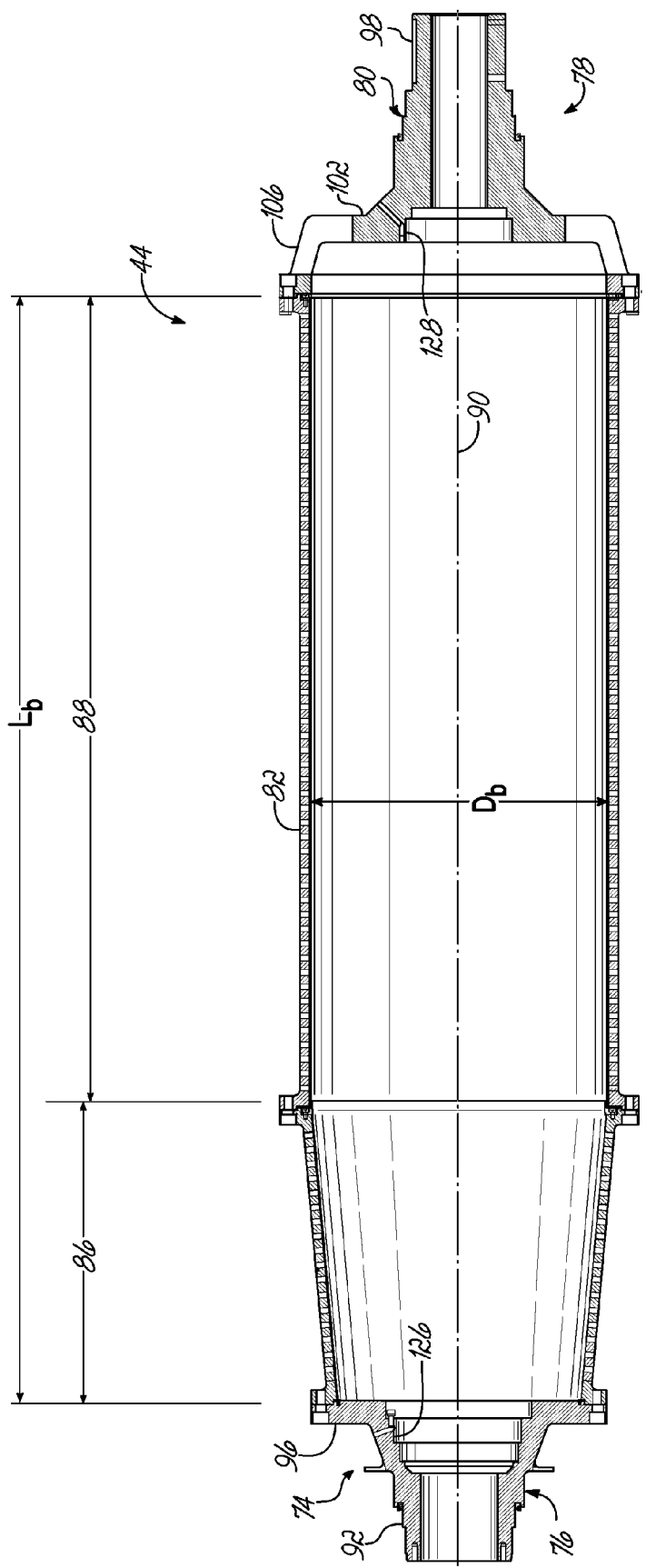
FIG. 3 is a cross-sectional view of the inner housing or basket shown in the filtration centrifuge of FIG. 2.

In another embodiment, however, the basket diameter $D_b$ may vary along at least one or more portions of the length $L_b$ of the basket 44. By way of example, and as shown in FIG. 3, the basket 44 may include a first basket section 86 adjacent the first end 74 of the basket 44. The first basket section 86 includes a generally outwardly tapered (i.e., diverging) or cone-shaped configuration in a direction from first end 74 toward second end 78. The first basket section 86 may be followed by a second basket section 88 generally configured as a right circular cylinder. The first basket section 86 (e.g., the conical-shaped section) may extend between 0%-100% of the length of the basket 44. In one embodiment, however, the first basket section 86 extends for about 10% to about 30% of the length $L_b$ of the basket 44, and may substantially correspond in length to the pre-concentration zone 66a of the filtration centrifuge 40 (FIG. 1). The cone angle in the first basket section 86 may be selected based on the specific application and/or other factors including, for example, desired cake thickness or other desired aspects of the fiber or constituents removed with the water through the side wall 82.

The side wall 82 of the basket 44 may be configured as a screen so as to separate or filter the desired material from the liquid medium. For example, to separate or filter fiber from the initial slurry or the wash water (depending on the particular zone), the side wall 82 of the basket 44 may be configured as a screen adapted to permit the slurry (minus the fiber) and the wash water (and any starch and/or gluten washed off the fiber) to pass through the screen while preventing the fiber from passing therethrough. To this end, the screened side wall 82 may have several configurations. For example, in one embodiment, the side wall 82 may be generally solid with a plurality of holes or fenestrations formed therein and sized so as to achieve the filtration of the desired material. In another embodiment, the screened side wall 82 may be formed from wrapped wedge wire that defines the plurality of openings. In still further embodiments, the screened side wall 82 may be a bar screen, a thin metal screen (e.g., mesh screen), or a filter cloth having a metal reinforced design. Those of ordinary skill in the art will recognize other types of screens that may be used in accordance with embodiments of the invention. The openings in the screened side wall 82 may vary depending on the specific application and on the type of material being filtered. For example, for fiber filtration, it is contemplated that the openings in side wall 82 may be sized between approximately 35 microns and approximately 1,500 microns. These values are exemplary and those of ordinary skill in the art will recognize how to determine the size of the openings to achieve the filtration of the desired material.

In one aspect in accordance with various embodiments, the basket 44 is adapted to rotate about a central axis 90 so as to drive the liquid medium toward the side wall 82 of basket 44. For example, rotation of the basket 44 generates a centrifugal force that drives the slurry or fiber/wash water mixture (depending on the stage along the filtration centrifuge 40) toward the screened outer side wall 82. This force essentially presses the slurry or fiber/wash water mixture against the screen so as to trap the fiber while allowing the liquid medium (and any smaller constituents) to pass through the screen. The first and second hubs 76, 80, which are coupled to the screened side wall 82, are configured to facilitate rotation of the basket 44 within the outer housing 42. In this regard, the first hub 76 includes an extension portion 92 that extends through an opening 94 (FIG. 2) in the first end wall 50 of the outer housing 42, and a flange portion 96 coupled to side wall 82. As is generally known in the art, first hub 76 may include various seals, bearings, and/or other fittings that allow the first hub 76 to rotate relative to the opening 94 in end wall 50 of outer housing 42. As discussed in more detail below, the first hub 76 also rotates relative to the conveyor 46 and conduit lines 48 that extend within or into the basket 44 (FIG. 2).

Those of ordinary skill in the art will recognize conventional components (e.g., seals, bearings, fittings, etc) that permit such relative movement therebetween as well.

In a similar manner, second hub 80 includes an extension portion 98 that extends through an opening 100 (FIG. 2) in the second end wall 52 of outer housing 42, and a flange portion 102 coupled to side wall 82. As is generally known in the art, second hub 80 may include various seals, bearings, and/or other fittings that allow the second hub 80 to rotate relative to the opening 100 in end wall 52 of outer housing 42. As discussed in more detail below, the second hub 80 also rotates relative to the conveyor 46 that extends within the basket 44 (FIG. 2). Those of ordinary skill in the art will recognize conventional components (seals, bearings, fittings, etc) that permit such relative movement therebetween. As shown in FIG. 3, the flange portion 102 of second hub 80 includes a coupling between the side wall 82 and the second hub 80 having a plurality of circumferentially-spaced legs 106 that define openings (not shown) therebetween. The openings allow the filtered material exiting the last washing stage, such as washing zone 66c in FIG. 2 (or enhanced de-watering stage, compaction stage, air dry stage, or other stage adjacent chute 70), to flow to chute 70 and through outlet 72, where the material may be collected for further processing.

In reference to FIG. 2, rotation of the basket 44 may be achieved by a suitable motor or other motive force-generating device. By way of example, the second hub 80 may be operatively coupled to a motor, shown schematically at 110, so as to cause second hub 80 and thus basket 44 to rotate about central axis 90. For example, a suitable belt (not shown) may couple the motor 110 to a pulley 111 on filtration centrifuge 40 to rotate basket 44. In one embodiment, the motor 110 may be coupled to a controller, such as a computer, and shown schematically at 112, for controlling the rotational speed of the basket 44. Such a controller 112 is generally known to those of ordinary skill in the art. Thus, the rotational speed of the basket 44 may be selectively varied depending on the specific application. In one embodiment, the basket 44 may be rotated at a speed (e.g., revolutions per minute) that generates a G force between approximately 100 G to 4,000 G (and may depend on basket diameter, type of material being filtered, etc.) at the side wall 82 of the basket 44. In one embodiment, such as for corn wet milling processes, the basket 44 may be rotated at a speed so as to generate between approximately 300 G and approximately 1,200 G at the side wall 82. These values are in contrast to conventional pressure screen and paddle screen devices, which typically have a maximum G force of 45 G and 200 G, respectively. Those of ordinary skill in the art will recognize that these values are exemplary and the speeds may be selected and optimized to meet the needs of a particular application.

In another aspect of various embodiments, the length to diameter (L/D) ratio at which the filtration centrifuge 40 operates has not been utilized or appreciated in the industry heretofore. For example, conventional systems typically have a L/D ratio of less than two, and typically less than 1.2, due to various design limitations and that most applications are directed to de-watering a medium. In contrast to conventional systems, the filtration centrifuge 40, which may include a pre-concentration zone, one or more washing zones, and possible other zones (e.g., de-watering, compaction, air, etc.), may have a L/D ratio greater than two. In one embodiment, the filtration centrifuge 40 may have a L/D ratio between approximately 2 and 10, and more preferably between 4 and 6. These values are exemplary and those of ordinary skill in the art will recognize other ratios suitable for a particular application.

The relatively large L/D ratio may be achieved by using a relatively small basket diameter $D_b$ (e.g., maximum value such as along second basket section 88) and a relatively large basket length $L_b$. By way of example, the basket diameter $D_b$ at its maximum value may be between approximately 100 mm and approximately 1,500 mm, and more particularly between approximately 200 mm and approximately 1,000 mm. The relatively small basket diameter $D_b$ of filtration centrifuge 40 provides higher G forces imposed on the liquid medium (e.g., slurry or fiber/wash water mixture) at the screened side wall 82, and thus allows for a greater amount of liquid to be removed from the filtered material resulting in a dryer product. For example, it is anticipated that the fiber material that exits the filtration centrifuge 40 via exit chute 70 may be between approximately 55% and approximately 75% water. This water concentration range represents a significant improvement over conventional systems (e.g, pressure and paddle screen devices), which typically provide fiber at about 80% to about 92% water. Additionally, the relatively large basket length $L_b$ of filtration centrifuge 40 provides a lower cost per filtration area. For example, to double the basket diameter $D_b$, it is estimated that the cost will increase between 5-7 times. However, to double the basket length $L_b$, it is estimated to increase the cost by about 50%-70%. Thus, for the same filtration area, it is more cost effective to have a relatively small basket diameter $D_b$ and a relative long basket length $L_b$. This arrangement will also result in higher G forces at the side wall 82 of the basket 44.

Figure 4:
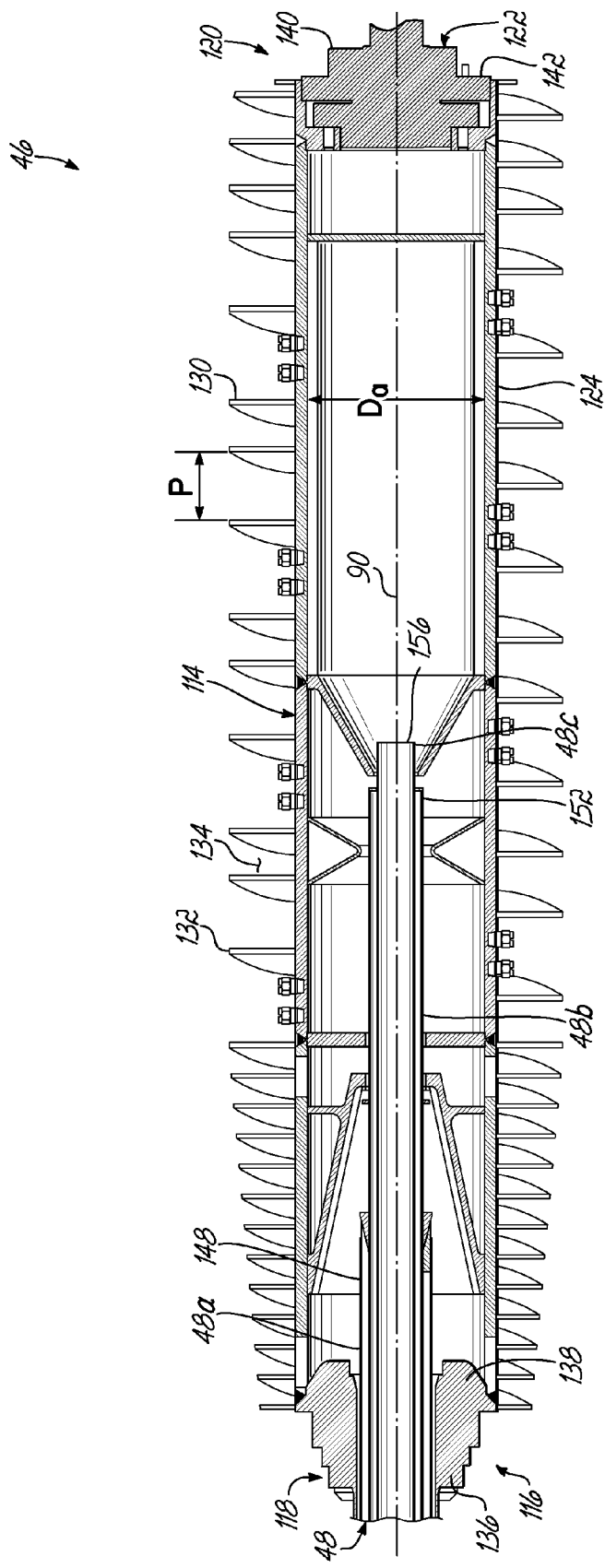
FIG. 4 is cross-sectional view of the conveyor shown in the filtration centrifuge of FIG. 2.

In another aspect of various embodiments, filtration centrifuge 40 further includes a conveyor 46 for moving or scrolling the material in the liquid medium from the first end 74 of the basket 44 toward the second end 78 thereof and to keep the filtration area at the screened side wall 82 clean. As illustrated in FIGS. 2 and 4, in one embodiment, the conveyor 46 may be configured as a generally hollow screw or auger 114 generally coaxially disposed within the basket 44. The auger 114 includes a first end 116 defined by a first hub 118, a second end 120 defined by a second hub 122, and at least one side wall 124 extending between the first and second ends 116, 120 and coupled to the first and second hubs 118, 122. The first and second hubs 118, 122 of the auger 114 may be operatively coupled to the first and second hubs 76, 80 of the basket 44. By way of example, the first and second hubs 76, 80 of the basket 44 may include cavities 126, 128 (FIG. 3), respectively, for receiving the first and second hubs 118, 122 of the auger 114 therein. While the auger 114 may have any suitable shape, in one embodiment, the auger 114 may be generally cylindrical and have a generally circular cross-sectional shape characterized by an auger diameter $D_a$. In one embodiment, the auger diameter $D_a$ may be substantially constant along the length of the auger 114. In an alternative embodiment, however, the auger diameter $D_a$ may vary along the length of the auger 114, such as by having a generally conical shape (not shown). As recognized by those of ordinary skill in the art, other configurations may also be possible.

To facilitate movement of the desired filtered material (e.g., fiber) along the filtration centrifuge 40, the auger 114 may include at least one generally radially-extending, helical thread 130 projecting from the side wall 124 of the auger 114. The thread 130 includes an outer edge 132 configured to be located in close proximity to the inner surface of the side wall 82 of the basket 44 (FIG. 2). For example, a small gap (on the order of 0.3 mm-2.0 mm) may exist between the outer edge 132 of the thread 130 and the side wall 82 of the basket 44 so as to accommodate, for example, relative movement therebetween, yet remain effective for keeping the filtration area at the screened side wall 82 clean. As explained in more detail below, the generally annular space 134 defined between the auger 114 and the basket 44 (FIG. 2), and occupied by the threads 130, provides a fluid flow passage for the liquid medium (e.g., slurry or wash water) during the filtration of the material (e.g., fiber). Accordingly, the annular space 134 must be sized to accommodate the design throughput of the filtration centrifuge 40. In an exemplary embodiment, for example, the auger 114 may have an auger diameter $D_a$ between approximately 0.4 $D_b$ and 0.8 $D_b$ and the distance between the auger 114 and the basket 44 (nearly equal to the height of thread 130) is between approximately 0.01 $D_b$ and 0.4 $D_b$. These values are exemplary and those of ordinary skill in the art may readily determine the auger diameter $D_a$ and/or radial spacing between the auger 114 and the basket 44 for specific applications.

Figure 5:
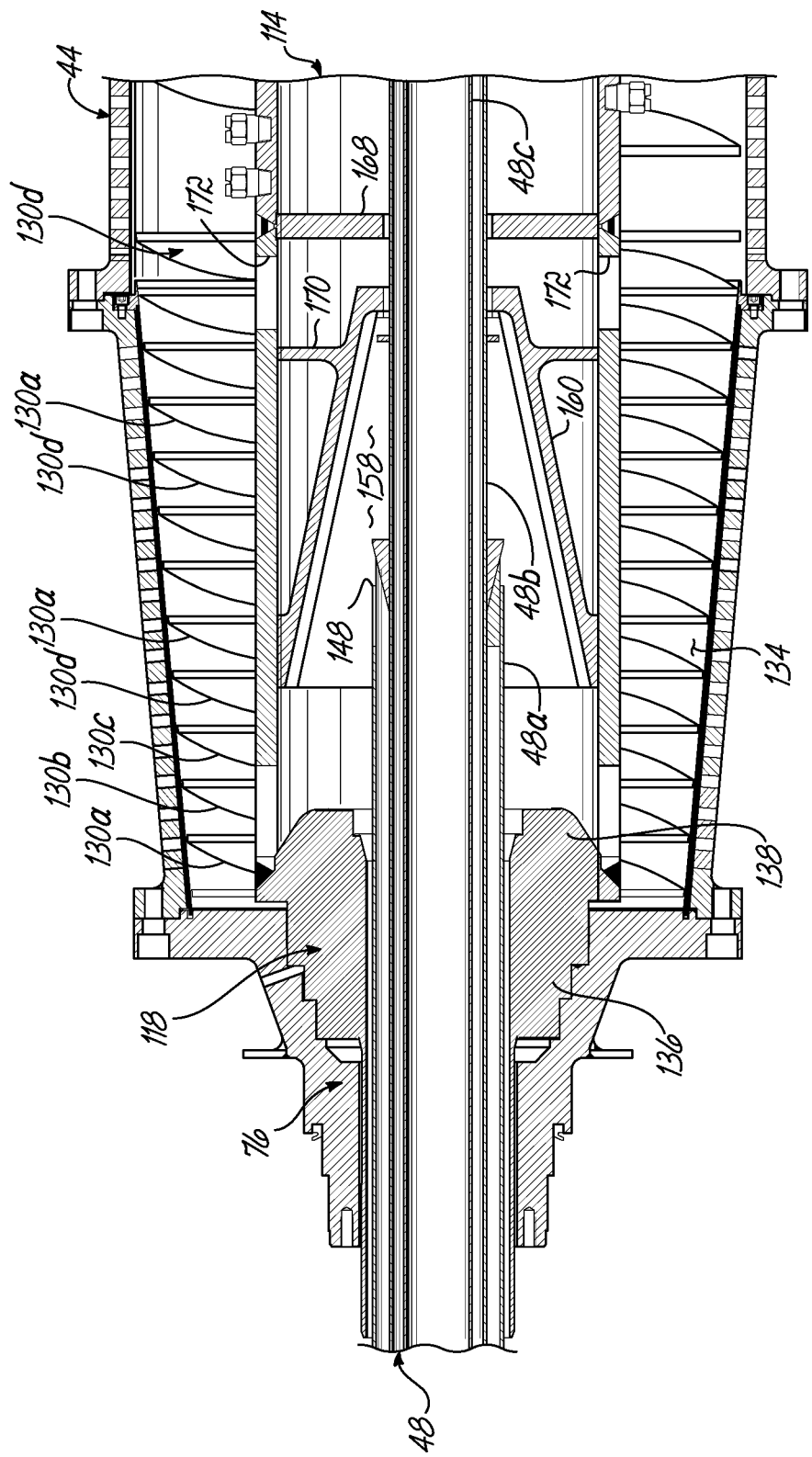
FIG. 5 is an enlarged view of a portion of the filtration centrifuge shown in FIG. 2.

In one embodiment, and as illustrated in FIGS. 4 and 5, the auger 114 may have a multi-flight configuration (e.g., having multiple helical threads extending along at least a portion of the length thereof). By way of example, the auger 114 may include between 2 and 6 flights, and more preferably between 3 and 4 flights (4 shown) along at least a portion of the auger length. While each of the flights 130a, 130b, 130c, 130d may extend the full length of the auger 114, in one embodiment, one or more of the flights may extend for less than the full length of the auger 114. More particularly, in one exemplary embodiment, the multi-flight configuration of the threads 130a, 130b, 130c, 130d may extend along the length of the auger 114 corresponding to the length of the pre-concentration zone 66a and only one of the threads, e.g., 130a, may extend thereafter along the washing zones 66b, 66c. In this regard, it is believed that the multi-flight configuration of the threads 130 in the pre-concentration zone 66a at least in part effectively enhances the filtering of the material from the liquid medium while preventing the basket 44 from plugging. Those of ordinary skill in the art will recognize other configurations of threads 130 that facilitate the movement of the material through the filtration centrifuge 40 to meet the requirements of a particular application, and the invention is not limited to the particular configuration shown in FIG. 5. For example, auger 114 may have a single flight configuration, such as that shown in FIG. 10.

In addition to the multi-flight configuration of the threads 130 on auger 114, another design variable that allows the auger 114 to be configured for specific applications is the pitch P of the threads 130 along the length of the auger 114 (FIG. 4). In one embodiment, for example, the pitch P may vary along the length of the auger 114. More specifically, in one exemplary embodiment, the pitch P of the threads 130 in the pre-concentration zone 66a may be relatively large, such as between 0.1 $D_b$ and 0.6 $D_b$, and decrease in the washing zones 66b, 66c. For example, the pitch in the washing zones 66b, 66c may be between 0.1 $D_b$ and 0.4 $D_b$. In this regard, it is believed that the relatively large pitch configuration of the threads 130 in the pre-concentration zone 66a at least in part effectively enhances the filtering of the material from the liquid medium while preventing the basket 44 from plugging. Those of ordinary skill in the art will recognize other variable pitch configurations of threads 130 that facilitate the movement of the material through the filtration centrifuge 40 to meet the requirements of a particular application, and the invention is not limited to the particular pitch configuration shown in FIGS. 4 and 5. For example, the pitch P may be relatively constant along the length of the auger 114.

In a further aspect in accordance with various embodiments, the auger 114 is adapted to rotate about central axis 90. Rotation of the auger 114 causes the thread(s) 130 to rotate in order to move the filtered material (e.g., fiber) down the filtration centrifuge 40. The first and second hubs 118, 122, which are coupled to the side wall 124 of auger 114, are configured to facilitate rotation of the auger 114 within the basket 44. In this regard, the first hub 118 includes an extension portion 136 that extends into the cavity 126 of the first hub 76 of the basket 44, and a flange portion 138 coupled to the side wall 124. As is generally known in the art, first hub 118 may include various seals, bearings, and/or other fittings that allow the first hub 118 to rotate relative to the first hub 76 of the basket 44. The first hub 118 of auger 114 also rotates relative to the conduit lines 48 that extend within the interior of the auger 114. Those of ordinary skill in the art will recognize conventional components (e.g., seals, bearings, fittings, etc.) that permit such relative movement therebetween as well.

In a similar manner, second hub 122 includes an extension portion 140 that extends into the cavity 128 of the second hub 80 of the basket 44 (FIG. 1), and a flange portion 142 coupled to the side wall 124. As is generally known in the art, second hub 122 may include various seals, bearings, and/or other fittings that allow the second hub 122 to rotate relative to the second hub 80 of the basket 44. As there may be no conduit line extending through second hub 122, the hub may have a closed configuration (FIG. 4).

Rotation of the auger 114 may be achieved by a suitable motor or other motive force-generating device. For example, one of the first or second hubs 118, 122 may be operatively coupled to an electric motor so as to cause the auger 114 to rotate about central axis 90 (not shown). Although the motor that rotates the auger 114 may be separate from the motor 110 that rotates the basket 44, in one exemplary embodiment, and as schematically illustrated in FIG. 2, motor 110 may also be used to rotate the auger 114. Those of ordinary skill in the art will recognize that if separate motors are used to rotate the basket 44 and auger 114, the motors may be controlled by the same controller, such as controller 112, or by separate controllers (not shown).

In the embodiment illustrated in FIG. 2, the same motor 110 and controller 112 provide for and control the speed of both the basket 44 and the auger 114. Although the filtration centrifuge 40 may be configured such that the basket 44 and auger 114 rotate at the same speed, in an exemplary embodiment, the basket 44 and auger 114 may be configured to rotate at different speeds. In this regard, the filtration centrifuge 40 may include a gear box, schematically shown at 144, to provide for the different rotational speeds between the basket 44 and the auger 114. Such gear boxes 144 and their internal components are generally known in the art and a detailed description herein will be omitted. In one embodiment, for example, the gear box 144 may be configured to reduce the rotational speed of the auger 114 relative to the basket 44. Alternatively, the gear box 144 may be configured to increase the rotational speed of the auger 114 relative to the basket 44.

The gear box 144 may be operatively coupled to the controller 112 for controlling the differential in the rotational speeds (schematically shown in FIG. 2). For example, the gear box 144 may be coupled to a small motor (not shown), which is operatively coupled to the controller 112, that controls the differential rotational speed between the basket 44 and the auger 114. In one embodiment, the gear box 144 may be configured such that a differential in rotational speed between the basket 44 and auger 114 is between 0 and about 200 rpm. This range is exemplary and, depending on the configuration of the gear box 144, those of ordinary skill in the art will recognize that the range may be adjusted to meet a specific application. Those of ordinary skill in the art may also recognize other known devices for creating a differential speed between the basket 44 and auger 114, including, for example, various gear reduction designs and hydraulic drives.

The filtration centrifuge 40 includes a plurality of generally concentric conduit lines 48 generally coaxially disposed in auger 114 for supplying liquid medium (e.g., the slurry and wash water) to the centrifuge 40. The number of conduit lines 48 generally corresponds to the number of zones 66 in the filtration centrifuge 40. By way of example, and as shown in FIGS. 2 and 4, the filtration centrifuge 40 includes one pre-concentration zone 66*a* and two washing zones 66*b*, 66*c*. Accordingly, fluid conduit lines 48 include one slurry supply line 48*a* and two wash water supply lines 48*b*, 48*c*. The slurry supply line 48*a* includes an inlet 146 (FIGS. 1 and 6) for receiving the slurry and an outlet 148 positioned in the pre-concentration zone 66*a* of the filtration centrifuge 40 and within the interior of auger 114. In a similar manner, the first water supply line 48*b* includes an inlet 150 (FIGS. 1 and 6) for receiving wash water and an outlet 152 positioned in the first washing zone 66*b* and within the interior of the auger 114. The second water supply line 48*c* includes an inlet 154 (FIGS. 1 and 6) for receiving wash water and an outlet 156 positioned in the second washing zone 66*c* and within the interior of the auger 114.

Figure 6:
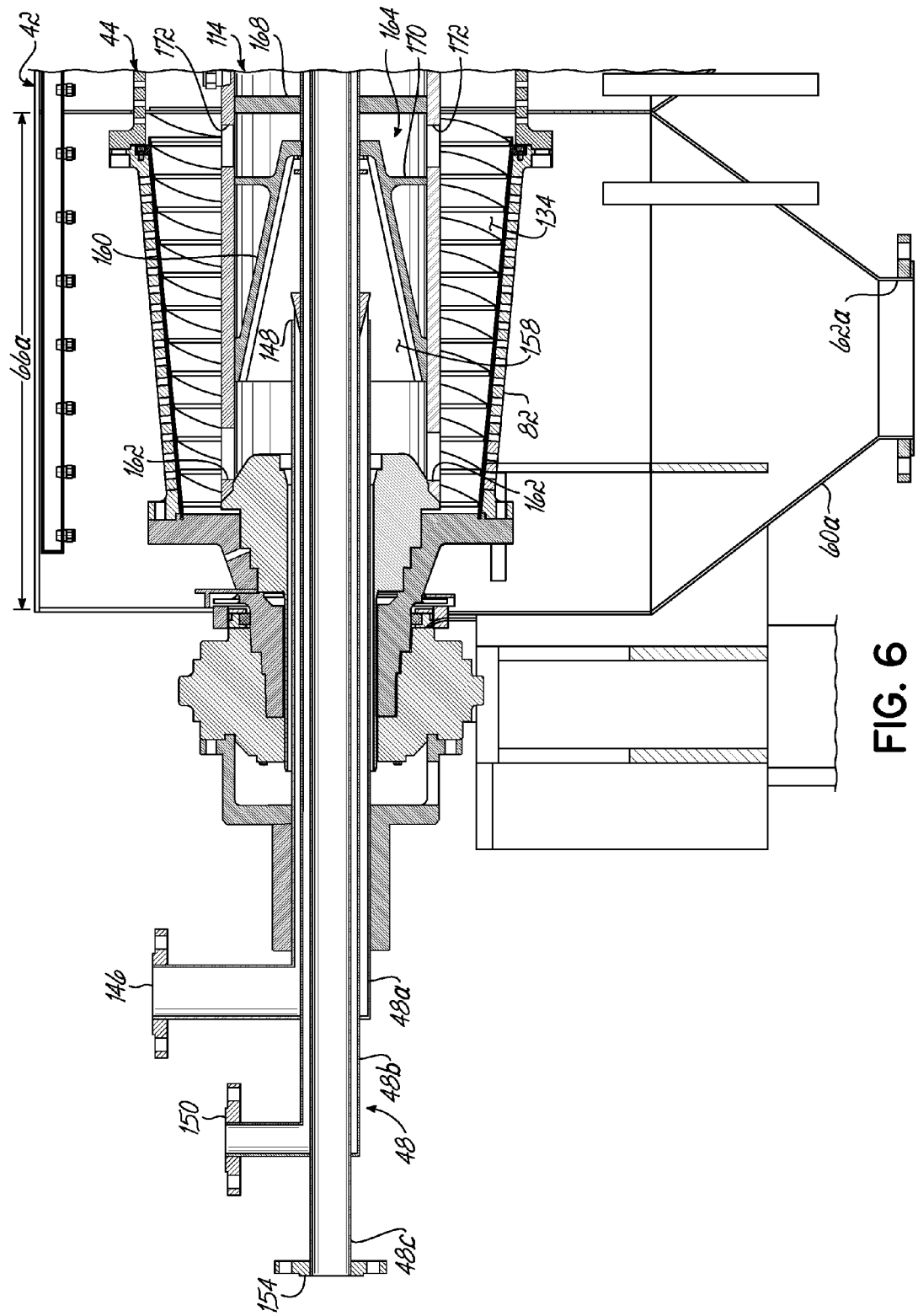
FIG. 6 is an enlarged view of a portion of the filtration centrifuge shown in FIG. 2 illustrating the pre-concentration zone.

Operation of the filtration centrifuge 40 will now be described. To facilitate understanding of various aspects of the invention, operation of the filtration centrifuge 40 will be described in the context of fiber filtration in a corn wet mill process. It should be appreciated, however, that the filtration centrifuge 40 may be used in a wider range of applications and is not limited in use to the corn wet mill process described herein. The motor 110 is activated so as to initiate rotation of the basket 44 and the auger 114 at their designated speeds, as described above. As best illustrated in FIG. 6, the slurry is supplied to the inlet 146 of the slurry conduit 48*a* so as to flow through the outlet 148 and into a chamber 158 within the auger 114 and generally associated with the pre-concentration zone 66*a*. The chamber 158 includes a generally cone-shaped guide 160 that directs the slurry into the annular space 134 between the auger 114 and the basket 44. In this regard, the auger 114 may include at least one opening 162 (two shown) that provides fluid communication between the chamber 158 and the annular space 134. Due to the rotation of the auger 114 and the resulting motion of the threads 130, the slurry is moved along the length of the pre-concentration zone 66*a* and fiber is filtered from the slurry by allowing the water, starch, gluten, and possibly other relatively small constituents of the slurry to pass through the screened side wall 82 of the basket 44 and drain into hopper 60*a* while the fiber and possibly relatively large constituents of the slurry are retained in the basket 44.

Due to the relative rotation between the conduit lines 48 and the auger 114, it may be possible for fiber to pass by the cone guide 160 within the auger 114 and pass into the washing zones 66*b*, 66*c*. To prevent or reduce the likelihood of such an event, the filtration centrifuge 40 may include a leak chamber 164 positioned about an end of the guide 160. The chamber 164 is defined by a baffle plate 168 at one end thereof and by a closed web 170 at an opposite end thereof and extending between the guide 160 and the auger 114. The auger 114 may include at least one opening 172 (two shown) that provides fluid communication between the leak chamber 164 and the annular space 134. Thus, should any fiber leak past the end of the guide 160 and into leak chamber 164, the fiber will flow through the openings 172 and into the annular space 134. In this way, the likelihood of fiber passing beyond the baffle plate 168 is significantly reduced. As explained in more detail below, fiber is undesirable in the washing zones 66b, 66c due to possible plugging of nozzles used in those zones.

At the end of the pre-concentration zone 66a, the fiber has been sufficiently concentrated so as to allow the fiber to be washed. For example, in one embodiment, the fiber is believed to be between about 55% and about 75% water at the end of the pre-concentration zone 66a. At such concentration levels, which are significantly lower than conventional devices, the fiber may be more effectively washed to remove the additional starch and/or gluten that remains associated with the fiber after the initial pre-concentration zone 66a (e.g., utilizing displacement washing techniques). To this end, the threads 130 of the auger 114 move the fiber along the length of the filtration centrifuge 40 and into the first washing zone 66b (FIG. 1). In reference to FIGS. 2, 6 and 7, wash water is supplied to the inlet 150 of the first water conduit 48b so as to flow through the outlet 152 and into a chamber 174 generally associated with the first washing zone 66b. The chamber 174 is bounded on one side by the baffle plate 168 and bounded on the opposite side by a conical member 176, which includes an end adjacent the conduit lines 48. The chamber 174 may further include a support member 180 that supports the water conduit lines 48b, 48c within chamber 174.

Figure 7:
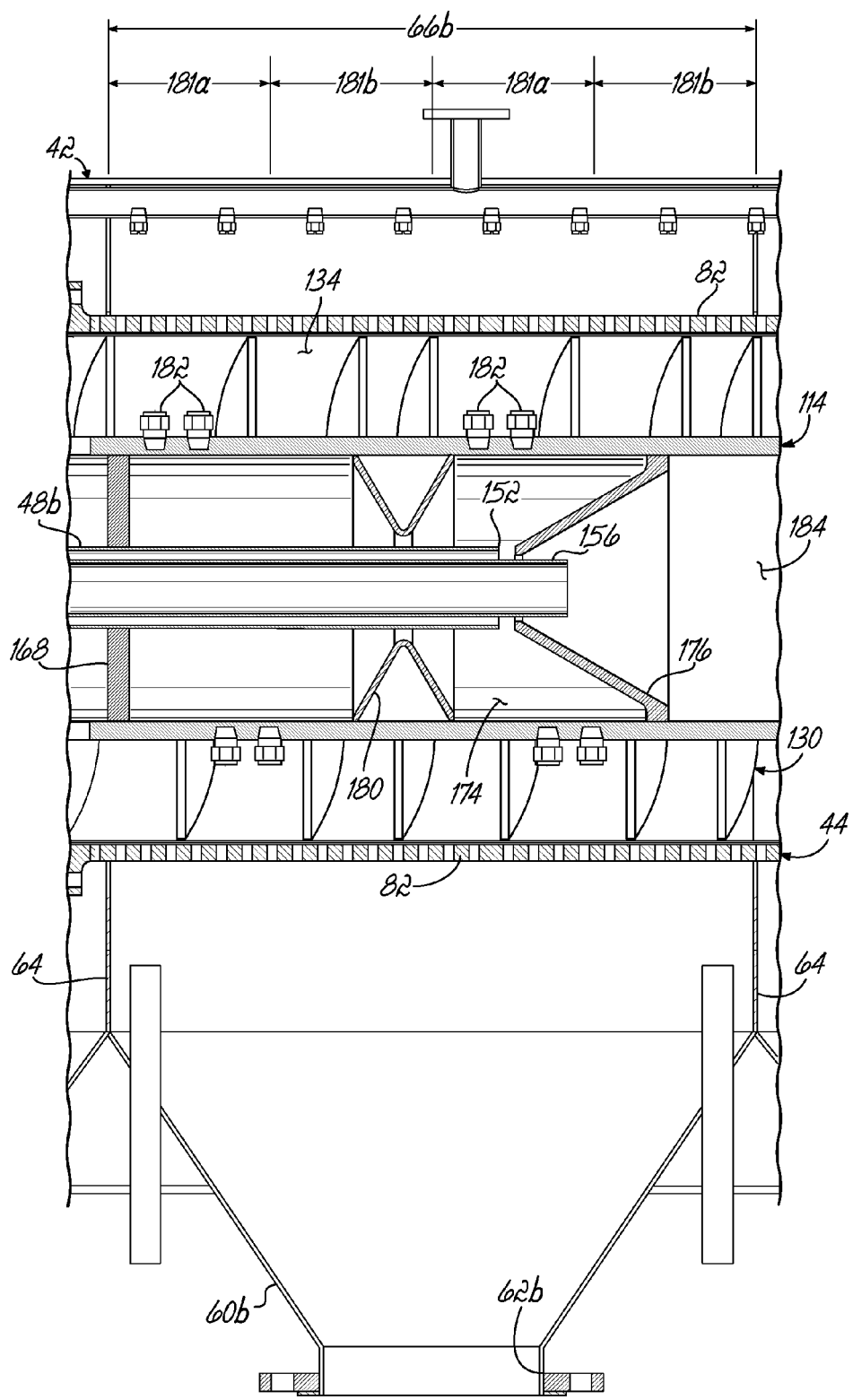
FIG. 7 is an enlarged view of a portion of the filtration centrifuge shown in FIG. 2 illustrating the first washing zone.
Figure 8:
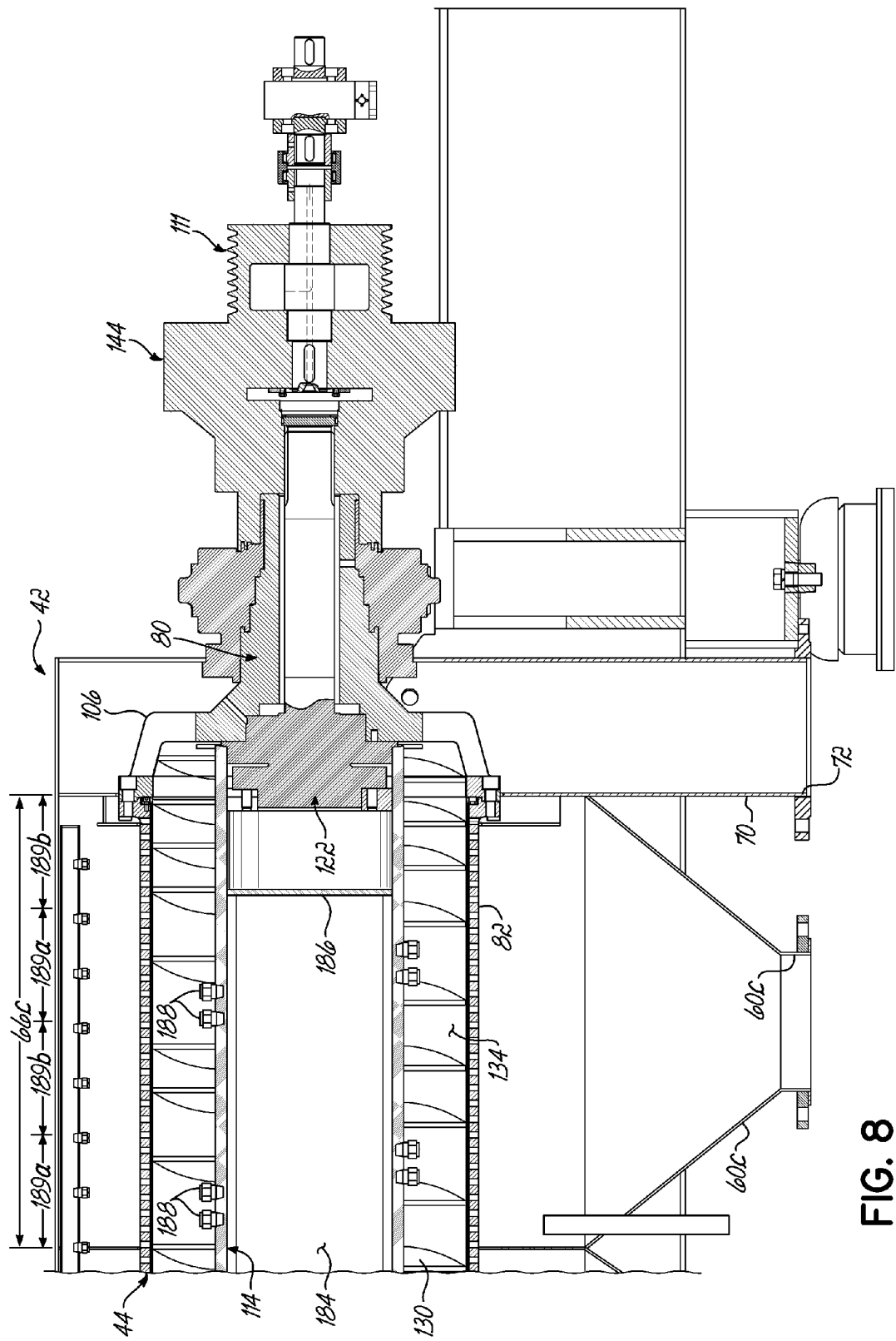
FIG. 8 is an enlarged view of a portion of the filtration centrifuge shown in FIG. 2 illustrating the second washing zone.

The first washing zone 66b includes at least one rinsing stage 181a and at least one de-watering stage 181b. For example, as illustrated in FIG. 7, the first washing zone 66b includes two rinsing/de-watering cycles. This is exemplary and those of ordinary skill in the art will recognize that the number of rinsing/de-watering cycles may vary depending on the specific application. In the rinsing stage 181a, wash water is added to the fiber to remove the additional starch and/or gluten associated with the fiber. The de-watering stage 181b separates the fiber by removing the wash water, and any starch/gluten washed from the fiber.

In this regard, in the rinsing stage 181a, wash water flows into chamber 174 from conduit line 48b and then is injected into the annular space 134 via at least one, and preferably a plurality of, nozzles 182. In one embodiment, for example, the nozzles 182 may be circumferentially spaced about the auger 114 at a fixed axial location (e.g., in a ring configuration). The nozzles 182 may be susceptible to plugging by fiber and it is for at least this reason that it is undesirable to have fiber present in chamber 174. The wash water injected into the annular space 134 in the washing zone 66b effectively washes the fiber. Additionally, the fiber is filtered from the wash water by moving the fiber/wash water mixture through the de-watering stage 181b. This allows the wash water and any additional starch and/or gluten to pass through the screened side wall 82 of the basket 44 and drain into hopper 60b while the fiber is retained in the basket 44. As noted above, the fiber is subjected to a second rinsing/de-watering cycle 181a, 181b in the first washing zone 66b. At the end of the first washing zone 66b, the fiber has been washed and filtered (e.g., twice) such that it may have approximately the same concentration of water as at the end of the pre-concentration zone 66a (e.g., between about 55% and about 75% water). Depending on the amount of water added in the first washing zone 66b and the particular configuration of the filtration centrifuge 40, it may be possible to further reduce the water concentration of the fiber while still providing effective washing.

After the first washing zone 66b, the threads 130 of the auger 114 continue to move the fiber along the length of the filtration centrifuge 40 and into the second washing zone 66c having rinsing/de-watering stages 189a, 189b. In reference to FIGS. 2 and 6-8, wash water is supplied to the inlet 154 of the second water conduit 48c so as to flow through the outlet 156 and into a chamber 184 generally associated with the second washing zone 66c. The chamber 184 is bounded on one side by the conical member 176 and bounded on the opposite side by plate 186. Wash water flows into chamber 184 from conduit line 48c and then is injected into the annular space 134 via at least one, and preferably a plurality of, nozzles 188, which may be similar to nozzles 182. The wash water injected into the annular space 134 in the washing zone 66c effectively washes the fiber. Additionally, the fiber is filtered from the wash water by moving the fiber/wash water mixture through the de-watering stage 189b. This allows the wash water and any additional starch and/or gluten to pass through the screened side wall 82 of the basket 44 and drain into hopper 60c while the fiber is retained in the basket 44. As noted above, the fiber is subjected to a second rinsing/de-watering cycle 189a, 189b in the second washing zone 66c. At the end of the second washing zone 66c, the fiber has been washed and filtered such that it may have approximately the same concentration of water as at the end of the pre-concentration zone 66a. As noted above, however, it may be possible to reduce the water concentration in the second washing zone 66c.

The washed and filtered fiber exits adjacent the second end 78 of the basket 44 and flows into the exit chute 70 and to outlet 72. When the fiber exits the chute 70, the fiber may be transported to a remote site and further processed to result in a desired product. Moreover, the slurry that passes through the screened side wall 82 in the pre-concentration zone 66a, as well as the wash water, starch and/or gluten that pass through the screened side wall 82 in the washing zones 66b, 66c may also be further processed, such as according to the corn wet mill process as described above.

In one aspect in accordance with various embodiments, the wash water for the washing zones 66b, 66c may implement counter current washing methodologies. For example, clean wash water may be supplied to the last washing zone 66c via the inlet 154 of second water conduit 48c. The wash water that is collected by hopper 60c, which may include water, starch, and/or gluten, is then directed through outlet 62c and supplied to the inlet 150 of the first water conduit 48b. This once used wash water is then used to wash the fiber in the first washing zone 66a. The wash water that is collected by hopper 60b may then be combined with the slurry (minus the collected fiber) collected in hopper 60a and passed to the next step in the corn wet mill process, for example. Those of ordinary skill in the art will recognize how to implement the counter current washing methodology when there are additional washing zones or other zones in the filtration centrifuge 40.

In a further aspect in accordance with various embodiments, filtration centrifuge 40 may be configured to include an air blowing zone. Such an air blowing zone is adapted to further dry the fiber (e.g., reduce the water concentration of the fiber) by blowing hot air (or other suitable fluid) over the fiber. In this regard, a hot air source may be in fluid communication with the annular space 134 adjacent the second end 78 of the basket 44, such as with appropriate conduits. The hot air may be supplied to the filtration centrifuge 40 via its second end, for example. The hot air may be introduced into the fiber during, for example, the de-watering stage of the last washing zone 66c. Alternatively, a separate stage may be added to filtration centrifuge 40 for the purpose of drying the fiber using hot air or other suitable fluids.

In another aspect in accordance with various embodiments, filtration centrifuge 40 may include an adjustable brush assembly adapted to improve the filtration rate and re-generate the filtration surface along the screened side wall 82 of the basket 44. In this regard, the auger 114, and more particularly, the outer edge 132 of the threads 130 may include a brush (not shown) for sweeping across the screened side wall 82 of the basket 44. The brush may be used, for example, when the material being filtered has a size on the order of the gap between the outer edge 132 of the threads 130 and the inner surface of the side wall 82 of the basket 44. In such applications, the brush may extend across the gap so as to loosen the material from the screened side wall 82 and thus prevent or reduce plugging, as well as to facilitate movement of the material along the centrifuge.

The filtration centrifuge 40, as described above, provides a number of advantages relative to current filtration systems. The various features of filtration centrifuge 40 culminate in a synergistic effect that has heretofore not been fully appreciated in the industry. The features of the filtration centrifuge 40, including, for example, the multi-flight design of the threads 130 of the auger 114, the conical shape of the basket 44 in the pre-concentration zone 66a, the relatively large L/D ratio at which the centrifuge is capable of operating, and/or other features allows the filtration centrifuge 40 to have an improved, more compact design. In this regard, one or more of the features allows the filtration centrifuge 40 to be a single, self-contained device that performs both the initial filtering of the liquid medium to remove the desired filtered material, and washing of the material to remove additional constituents, such as additional starch and/or gluten, therefrom.

Heretofore, such filtering and washing has been achieved by serially connecting a plurality of separate, dedicated devices. In addition, one or more features of the filtration centrifuge 40 provides for efficient washing zones, such that the number of washing zones may be reduced compared to more conventional devices. In this regard, filtration centrifuge 40 employs displacement washing techniques, wherein wash water having a relatively high concentration of constituents is replaced with wash water having a lower concentration of constituents. This is in contrast to conventional filtration systems that use dilution washing techniques, wherein material is rinsed in water that is not replaced. As a result, the water may become saturated with constituents such that further removal of constituents from the filtered material becomes minimal. The ability of filtration centrifuge 40 to more effectively "dry" (i.e., reduce the concentration of water in the filtered material) in the pre-concentration zone 66a, in turn, allows the use of such displacement washing techniques. If the concentration of water in the filtered material is too high (as in conventional systems) displacement washing techniques may not prove beneficial and as a result, less-effective dilution washing techniques are implemented. In addition to the above, due to combining the function of multiple devices into a single device and the more efficient process of washing the filtered material, the filtration centrifuge 40 may be made more compactly and therefore utilize floor space within a manufacturing facility in a more efficient manner. Moreover, such a design may also reduce the capital costs of the device, the labor and associated costs for maintaining the device, and the operating costs (e.g., use less water, etc.).

Furthermore, one or more of the features of filtration centrifuge 40 allows the filtered material to exit the centrifuge in a "dryer" condition as compared to existing filtration systems. For example, filtration centrifuge 40 may provide the filtered material at a water concentration of between about 55% and about 75% water, which is a significant reduction compared to conventional filtration systems. Providing a dryer product may result in additional benefits. For example, in many cases, in the corn wet mill process, the fiber collected in filtration systems are further processed by directing the fiber through a press to squeeze additional water from the fiber, and then directing the fiber through a dryer. The various apparatus that press the fiber are expensive and costly to maintain and operate. Additionally, energy costs associated with operation of the dryer is also expensive. By providing the fiber in a dryer state from the filtration centrifuge 40, the press may be omitted from the post processing of the fiber. Additionally, in regard to the drying step, significant energy savings may be achieved by having just a relatively small change in the concentration of water in the material. Alternatively, depending on the application, the dryer step may be omitted in the post processing of the fiber. Thus, the ability of filtration centrifuge 40 to provide a dryer material may allow manufacturers to forego or reduce the costs associated with these post processing steps.

In addition, one or more of the features results in the filtration centrifuge 40 being flexible and robust in use. For example, it is believed that filtration centrifuge 40 is capable of effectively functioning over a wide range of operating parameters. For example, filtration centrifuge 40 is capable of effectively accommodating a broad range of materials for filtering (e.g., fiber), a broad range of material sizes, as well as material that may be sharp or otherwise difficult to handle. In addition, the filtration centrifuge 40 is capable of accommodating an input slurry or feed having a wide concentration range (i.e., the filtration centrifuge 40 is generally not sensitive to the concentration of the input material).

Furthermore, the filtration centrifuge 40 includes a number of design variables that may be selected and/or varied to achieve a desired result for a particular application. By way of example, and as explained above, the auger 114 includes a number of design variables including the variable pitch of selected threads 130 and/or the number and/or respective lengths of the flights. These may be varied depending on the particular application. Another feature, which exemplifies the flexibility of centrifuge 40, is the capability of setting and controlling the differential rotational speed between the basket 44 and the auger 114. In one embodiment, for example, the centrifuge 40 may include a sensor (not shown) for measuring the torque on the auger 114. This information may be directed to the controller 112 and used to control the differential speed (and/or throughput or feed rate) so as to enhance the performance of the filtration centrifuge 40. This optimization may be done, for example, in an automated manner. In addition, it is believed that the cake thickness of the filtered material at different locations along the length of the basket 44 may be manipulated by varying one or more of the auger flights, thread pitch, and/or differential speed between the basket 44 and the auger 114.

Figure 9:
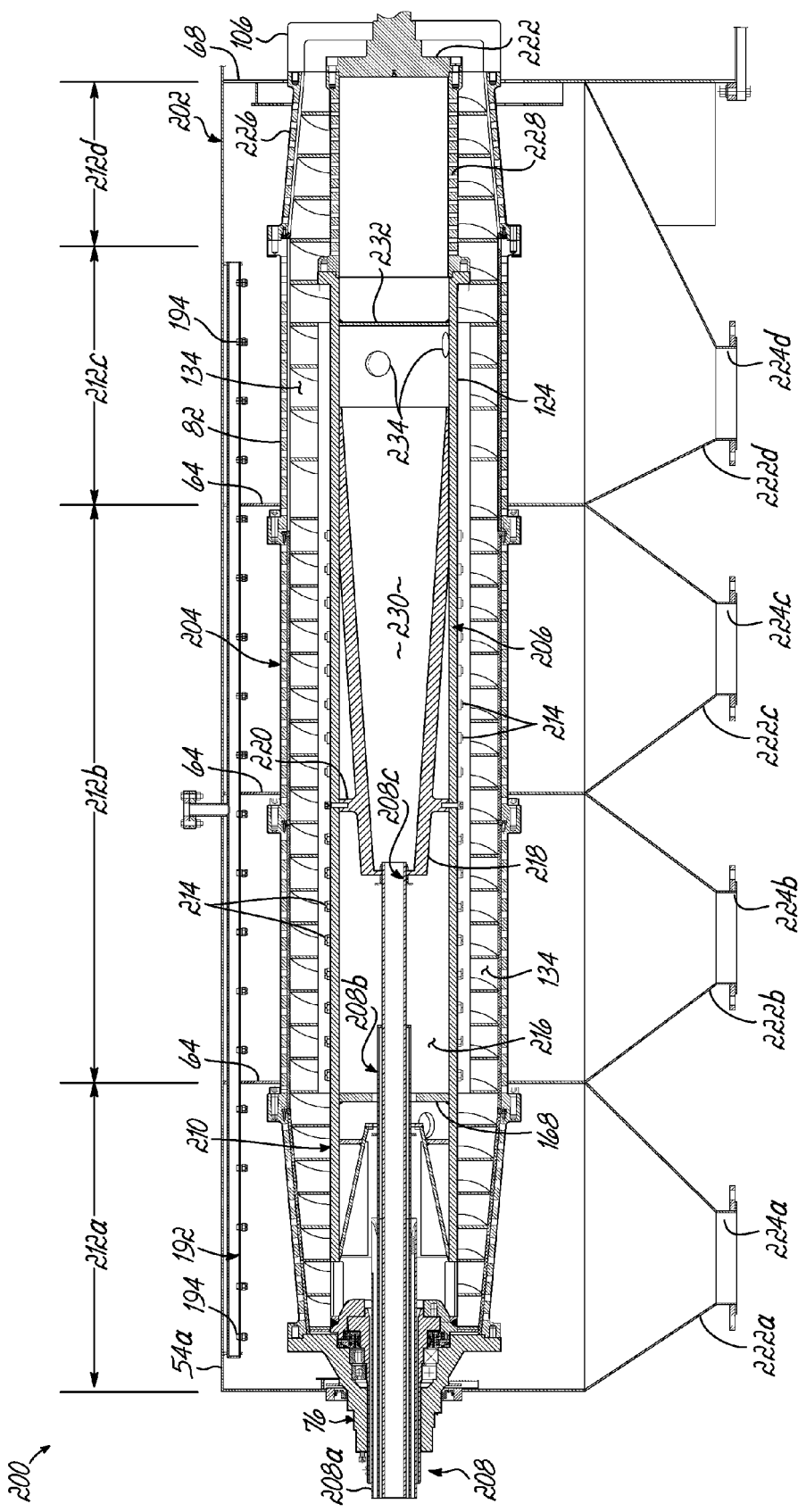
FIG. 9 is a cross-sectional view of a filtration centrifuge in accordance with another embodiment of the invention.

Another embodiment of a filtration centrifuge is shown in FIG. 9. Filtration centrifuge 200 is structurally and operationally similar to filtration centrifuge 40 shown and described above. Accordingly, a detailed description of the filtration centrifuge 200 is not deemed necessary. Instead, a detailed description of the modifications between the filtration centrifuges 40, 200 will be provided. Similar reference numbers in FIG. 9 will refer to like features shown in FIGS. 2-8. Filtration centrifuge 200 includes an outer housing 202, an inner housing or basket 204, a conveyor 206 generally coaxially disposed in the basket 204, and a plurality of conduit lines 208 generally coaxially disposed in conveyor 206. The conveyor 206 may be configured as an auger 210 similar to that described above.

One modification is directed to the number and/or types of zones provided in filtration centrifuge 200. For example, and as explained in more detail below, filtration centrifuge 200 may include a pre-concentration zone 212a, a washing zone 212b, a de-watering zone 212c, and a compaction zone 212d.

The pre-concentration zone 212a is similar to that described above in terms of the configuration and operation of the conduit lines 208, auger 210, basket 204, and housing 202 along the pre-concentration zone 212a and thus, a further description will not be provided herein. The washing zone 212b, however, has been modified. In regard to filtration centrifuge 40, each of the washing stages 66b, 66c included two rinsing/de-watering cycles spaced axially along the central axis 90 of filtration centrifuge. As shown in FIG. 9, after the pre-concentration zone 212a, there is only one washing zone 212b. Moreover, instead of one or more rinsing/de-watering cycles axially spaced along the centrifuge, auger 210 includes a plurality of nozzles 214 generally uniformly axially and circumferentially spaced along washing zone 212b. Such an arrangement provides a relatively uniform injection of wash water into washing zone 212b. In essence, the washing zone 212b becomes a rinse cycle without a corresponding de-watering cycle. Those of ordinary skill in the art should recognize that fluid (e.g., water, starch, gluten, etc) will be ejected from the basket 204 due to the centrifugal forces acting on the material. However, this occurs at locations where a relatively large amount of wash water is being introduced (by nozzles 214). In contrast, de-watering occurs when no wash water or alternatively, a relative small amount of fluid is being introduced.

In operation, wash water is supplied to the first water conduit 208b so as to flow through its outlet and into a chamber 216 in auger 210 generally associated with the washing zone 212b. The chamber 216 is bounded on one side by baffle plate 168 and bounded on the opposite side by a conical member 218. The conical member 218 includes a gapped or webbed support member 220 that allows wash water to flow thereby. The wash water in chamber 216 is injected into the annular space 134 via the nozzles 214 to wash the fiber and remove any remaining starch and/or gluten that may be associated with the fiber after the initial pre-concentration zone 212a. In the washing zone 212b, wash water having a first concentration of constituents (e.g., starch, gluten) is injected and water having a second concentration of constituents, which is higher than the first concentration, is ejected from the side wall 82 of basket 204. This fluid drains into one or more hoppers 222b, 222c and through respective outlets 224b, 224c. While two hoppers 222b, 222c may be associated with washing zone 212b, those of ordinary skill in the art will recognize that only one hopper may be provided for the washing zone 212b. When washing zones get relatively long, there may be some advantages with having multiple hoppers within a single washing zone. For example, the counter-current washing technique may be more effective using multiple hoppers. The invention should not be limited to having one hopper per zone, but those of ordinary skill will recognize that the number of hoppers (and/or compartments defined by interior panels 64) may vary depending on the particular application.

After the washing zone 212b, the threads 130 of auger 210 move the fiber along the filtration centrifuge 200 and into a de-watering zone 212c. The de-watering zone 212c is configured to remove the wash water and any additional starch/gluten from the fiber, but with little to no addition of more wash water (e.g., there is no wash water injected into the annular space 134 along the de-watering zone 212c via injection nozzles). Along the de-watering zone 212c, the water, starch, and gluten that pass through the screened side wall 82 of basket 204 drains into hopper 222d with the fiber being retained in the basket 204. Thus, the concentration of water in the filtered material may be reduced in the de-watering zone 212c.

Another modification in this embodiment is the inclusion of a compaction zone 212d in filtration apparatus 200. In this regard, the basket diameter $D_b$ may vary along the length of the basket 204 adjacent the second end thereof. By way of example, basket 204 may include a third basket section 226 adjacent the second end 78 of the basket. The third basket section 226 may include a generally inwardly tapered (i.e., converging) or cone-shaped configuration in a direction from first end 74 toward second end 78. In one embodiment, the third basket section 226 may extend for about 10% to about 30% of the length of the basket 204, and may substantially correspond in length to the compaction zone 212d of the filtration centrifuge 200. It is believed that the conical shape of the basket 204 along this portion essentially compacts the filtered material (e.g., fiber) due to a reduced cross-sectional area (and therefore volume) along this region. The water, starch, and gluten that pass through the screened side wall 82 of basket 204 in the compaction zone 212d drains into hopper 222d and through outlet 224d. This compaction further reduces the concentration of water in the filtered material resulting in dryer fiber being output from the filtration centrifuge 200. The cone angle in the third basket section 226 may be selected based on the specific application and/or other factors including, for example, desired cake thickness or other desired aspects of the fiber or constituents removed with the water through the side wall 82.

In one embodiment, an additional pathway for water to escape as a result of the squeezing of the filtered material may be provided in the compaction zone 212d. In this regard, the auger 210 may have side wall 124 configured as a screen 228 for at least a portion of the length of the compaction zone 212d. In this way, it is possible for fluid to escape not only through the screened side wall 82 of basket 204, but also through the side wall 124 of the auger 210 along at least a portion of this zone. As discussed in more detail below, the fluid which passes through the screen 228 may be directed into the annular space 134 in the de-watering zone 212c. Alternatively, the fluid may be removed from auger 210 through other means such as a drain conduit through the second end of filtration centrifuge 200.

In still a further embodiment, the filtration centrifuge 200 may be utilized to address additional problems in various industrial processes, such as the corn wet mill process. In this regard, and referring back to FIG. 1, to release starch, germ, gluten, fiber and other constituents from corn, the corn goes through a first grinding process 14 and a second fine grinding process 18. These grinding processes may result in some amount of a specific constituent being ground to relatively fine particles (e.g., less than about 50 microns). For example, relatively small pieces of fiber, referred to in the industry as fine fiber, are typically produced from the grinding steps 14, 18. Thus, while a relatively high percentage of the fiber does not get ground into very small particles, some relatively small percentage of the fiber may be ground into small particles Sufficiently small constituent particles may not be filtered out of the slurry during the fiber separation step 20. In this regard, the minimum screen size in conventional filtration systems is approximately 50 microns. Thus, fiber having a size less than this may pass through the screen and pass to the subsequent steps of the corn wet mill process.

In regard to the corn wet mill process, the generation of fine fiber has a number of drawbacks. One drawback is that the purity of the constituents that are meant to pass through the filtration system is reduced. In this regard, the starch, gluten, and other constituents that are passed through the filter are, in effect, diluted or contaminated with undesirable amounts of fiber (albeit small pieces of fiber). Second, the generation of fine fiber may reduce the amount or yield of starch, gluten, or other desirable constituents one can extract from the corn. In this regard, the finer the corn is ground in the grinding steps 14, 18, the more starch, gluten, and other constituents are released from the grain. However, fine grinding also increases the amount of fine fiber generated, and thus diminishes the ability of the filtration systems to remove the fiber from the slurry (i.e., more fine filter passes through the filtration system). Accordingly, due to the inability of conventional filtrations systems to remove fine fiber from the slurry, in current implementations of the corn wet mill process, the corn is not significantly ground, such that desirable constituents of the corn (starch, gluten, etc.) are not released therefrom and, in effect, are wasted. In one embodiment, the filtration centrifuge 200 may be utilized to address the filtration of fine fiber (or other small constituents) from a liquid medium. As a result, it is not only possible to improve the purity of the constituents passed through filtration centrifuge 200, but higher yields from the corn may now be achieved through the ability to grind more finely, but yet remove the fine fiber from the slurry.

In this regard, and in accordance with an aspect of the invention, the fiber collected in basket 204 may in essence be used as a filtering medium for fine fiber. More particularly, the fiber in basket 204 near the second end 78 thereof is relatively thick (e.g., between about 55% and about 75% water) and thus effectively comprises a relatively tight network of fibers that, in essence, collectively forms a matted material. This matted network of fibers collected in basket 204 may be used as a "filter" to separate the fine fiber from a liquid medium. To this end, it is believed that the network of fibers may include voids or openings that are smaller than the fine fiber thereby trapping the fine fiber within the network of fibers already collected in basket 204.

To configure filtration centrifuge 200 for such a purpose, the slurry carrying the fine fiber (e.g., the output from pre-concentration zone 212*a*) may be supplied to the second water conduit 208*c*, the exit of which is within a chamber 230 generally associated with the de-watering zone 212*c*. The chamber 230 is bounded on one side by the conical member 218 and bounded on the opposite side by plate 232. The auger 210 includes one or more apertures 234 that provide fluid communication between chamber 230 and the annular space 134. The slurry with the fine fiber flows into chamber 230 from conduit line 208*c* and then flows into annular space 134 via the apertures 234. Due to the forces imposed by rotation of the basket 204 and/or auger 210, the liquid medium which carries the fine fiber flows through the matted fibers already collected in basket 204, flows through the side wall 82 of basket 204, and drains into the hopper 222*d*. It is believed that the fluid collected in hopper 222*d* has a significantly reduced amount of fine fiber therein. Moreover, the fine fiber may be filtered from the liquid medium using the same apparatus that performs the initial filtration for the large pieces and washing of the fiber. This significantly reduces the costs, maintenance, etc. that is associated with conventional apparatus for filtering fine fiber. With the fine fiber removed from the liquid medium, the fluid collected in hopper 222*d* may be transported to another process in the corn wet mill process.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. For example, while the filtration centrifuges 40, 200 have been described herein as being in a generally horizontal orientation, other orientations are possible, including the centrifuges having a generally vertical orientation. Additionally, the centrifuges 40, 200 may be an open type of system or configured for closed operation. The filtration centrifuges 40, 200 may also be designed for pressurized operation. Still further, the filtration centrifuges 40, 200 may be operated continuously or configured to work in a batch mode of operation. As illustrated in FIGS. 2 and 10, the filtration centrifuges 40, 200 may include a basket cleaning system 192, including a plurality of nozzles 194 situated, for example, along the upper wall 54*a* of the outer housing 42, 202, respectively. The basket cleaning system 192 provides backwashing for cleaning the baskets 44, 204. Furthermore, those of ordinary skill in the art should recognize that the number and types of zones may be selected based on the specific application. For example, a filtration centrifuge in accordance with an embodiment may include a pre-concentration zone without any washing zones. Such an embodiment may further include a de-watering zone, and/or a compaction zone, and/or an air blowing zone. Thus, the number and types of zones may be selected based on a specific application.

In addition to the above, the filtration centrifuges 40, 200 as described above may be found beneficial in other industrial applications. By way of example, the chemical industry utilizes a crystal formation process wherein it is desirable to bring in a bulk material, separate out the crystals contained therein, and then wash the crystals. The filtration centrifuges as described herein may be used for such a process to achieve the results in a single device. Moreover, the juice industry similarly includes various processes wherein a bulk material is brought in and filtered. It may be desirable to wash the fruit or other bulk material as well. Again, the centrifuges as described herein may be used in such applications. Moreover, other corn or grain milling processes may benefit from filtration centrifuge disclosed herein. Additionally, other industries that seek to filter a material from a medium (e.g., liquid medium or otherwise) and/or wash the material may also benefit from the centrifuges as described herein.

While the corn wet mill process typically utilizes pressure or paddle screen devices and the advantages of the filtration centrifuges relative to these devices has been noted above, the filtration centrifuges described herein may also provide benefits to industries that utilize other types of filtration systems. For examples, some industries utilize decanter centrifuges and/or conic screen bowl centrifuges. Nevertheless, these centrifuges also have drawbacks which may be addressed by the filtration centrifuges disclosed herein. By way of example, decanter centrifuges have no washing zone and therefore separate devices must be used if washing the filtered material is desired. Of course these additional devices are costly and take up space within the manufacturing facility. Additionally, the filtration centrifuges described herein are able to provide a filtered material in a dryer state as compared to the output of a decanter centrifuge. As noted above, providing a dryer material may significantly reduce the energy costs associated with post processing of the material. Similarly, conic screen bowl centrifuges do not provide for washing of the filtered material. Furthermore, these centrifuges also have a relatively small L/D ratio and operate at G forces significantly reduced as compared to those provided by the filtration centrifuges described above.

Those of ordinary skill in the art will recognize how to modify or configure the filtration centrifuges so as to effectively operate in these other industries. Thus, the various features of the invention may be used alone or in numerous combinations depending on the needs and preferences of the user.

What is claimed is:

1. An apparatus for filtering a material from a medium, comprising:
a first housing having a first section having a generally conical shape, a second section having a shape of a right cylinder, and at least one wall with a plurality of openings formed therein;
a second housing substantially surrounding the first housing and adapted to collect the medium that passes through the openings in the first housing, the second housing including at least one interior panel that compartmentalizes the second housing into a plurality of zones, with each zone having a corresponding outlet;
a conveyor disposed in the first housing for moving at least the material in a direction along the first section of the first housing followed by the second section of the first housing; and
at least one conduit line in fluid communication with an interior of the first housing for supplying the medium to the apparatus,
wherein at least one of the first housing and conveyor rotate relative to a central axis to direct the medium toward the at least one wall so as to filter the material from the medium, and
wherein the generally conical shape of the first section of the first housing tapers outwardly along its length in a direction towards the second section.

2. The apparatus of claim 1, further comprising a third section having a generally conical shape.

3. The apparatus of claim 1, wherein the first section extends between approximately 10% and approximately 30% of the length of the first housing.

4. The apparatus of claim 1, further comprising:
a motor operatively coupled to the first housing for rotating the first housing about the central axis; and
a controller operatively coupled to the motor for controlling the rotational speed of the first housing.

5. The apparatus of claim 1, wherein the first housing rotates at a speed so as to subject the material to a G force between approximately 100 G and approximately 4,000 G.

6. The apparatus of claim 1, wherein the first housing has a length to diameter ratio of between approximately 2 and approximately 10.

7. The apparatus of claim 1, wherein the conveyor is configured as an auger having a first end, a second end, a side wall extending therebetween, and at least one helical thread extending from the side wall thereof.

8. The apparatus of claim 7, wherein the auger has a plurality of helical threads extending for at least a portion of the length of the auger.

9. The apparatus of claim 1, wherein the conveyor rotates about the central axis.

10. The apparatus of claim 1, wherein the first housing and the conveyor rotate about the central axis at different rotational speeds.

11. The apparatus of claim 10, wherein the conveyor rotates about the central axis at a rotational speed less than the first housing.

12. The apparatus of claim 1, further comprising:
a motor operatively coupled to the first housing and the conveyor for rotating the first housing and conveyor about the central axis;
a controller operatively coupled to the motor for controlling the rotational speed of at least one of the first housing and the conveyor; and
a gear mechanism for allowing the first housing to rotate at a rotational speed different than the conveyor.

13. The apparatus of claim 1, wherein the conveyor includes a side wall, at least a portion of the side wall having a plurality of openings formed therein.

14. The apparatus of claim 1, wherein the first housing has a length to diameter ratio of between approximately 4 and approximately 6.

15. An apparatus for filtering a material from a medium, comprising:
a first housing having a first section having a generally conical shape, a second section having a shape of a right cylinder, and at least one wall with a plurality of openings formed therein;
a second housing substantially surrounding the first housing and adapted to collect the medium that passes through the openings in the first housing, the second housing including at least one interior panel that compartmentalizes the second housing into a plurality of zones, with each zone having a corresponding outlet;
a conveyor disposed in the first housing for moving at least the material in a direction along the first section of the first housing followed by the second section of the first housing, the conveyor is configured as an auger having a first end, a second end, a side wall extending therebetween, and at least one helical thread extending from the side wall thereof and having a pitch that varies along the length of the auger; and
at least one conduit line in fluid communication with an interior of the first housing for supplying the medium to the apparatus,
wherein at least one of the first housing and conveyor rotate relative to a central axis to direct the medium toward the at least one wall so as to filter the material from the medium, and
wherein the generally conical shape of the first section of the first housing tapers outwardly along its length in a direction towards the second section.

16. The apparatus of claim 15, further comprising a third section having a generally conical shape.

17. The apparatus of claim 15, wherein the first section extends between approximately 10% and approximately 30% of the length of the first housing.

18. The apparatus of claim 15, further comprising:
a motor operatively coupled to the first housing for rotating the first housing about the central axis; and
a controller operatively coupled to the motor for controlling the rotational speed of the first housing.

19. The apparatus of claim 15, wherein the first housing rotates at a speed so as to subject the material to a G force between approximately 100 G and approximately 4,000 G.

20. The apparatus of claim 15, wherein the first housing has a length to diameter ratio of between approximately 2 and approximately 10.

21. The apparatus of claim 15, wherein the first housing has a length to diameter ratio of between approximately 4 and approximately 6.

22. The apparatus of claim 15, wherein the auger has a plurality of helical threads extending for at least a portion of the length of the auger.

23. The apparatus of claim 15, wherein the conveyor rotates about the central axis.

24. The apparatus of claim 15, wherein the first housing and the conveyor rotate about the central axis at different rotational speeds.

25. The apparatus of claim 24, wherein the conveyor rotates about the central axis at a rotational speed less than the first housing.

26. The apparatus of claim 15, further comprising:
- a motor operatively coupled to the first housing and the conveyor for rotating the first housing and conveyor about the central axis;
- a controller operatively coupled to the motor for controlling the rotational speed of at least one of the first housing and the conveyor; and
- a gear mechanism for allowing the first housing to rotate at a rotational speed different than the conveyor.

27. The apparatus of claim 15, wherein at least a portion of the side wall of the conveyor having a plurality of openings formed therein.

28. The apparatus of claim 15, wherein the at least one conduit includes a plurality of concentric conduit lines disposed lengthwise in an interior of the conveyor, at least one of the plurality of conduit lines is in fluid communication with the interior of the first housing for supplying the medium to the apparatus.

29. An apparatus for filtering a material from a medium, comprising:
- a first housing having a first section having a generally conical shape, a second section having a shape of a right cylinder, and at least one wall with a plurality of openings formed therein;
- a conveyor disposed in the first housing for moving at least the material in a direction along the first section of the first housing followed by the second section of the first housing; and
- a plurality of concentric conduit lines disposed lengthwise in an interior of the conveyor, at least one of the plurality of conduit lines is in fluid communication with an interior of the first housing for supplying the medium and the material to the apparatus, wherein at least one of the first housing and conveyor rotate relative to a central axis to direct the medium toward the at least one wall so as to filter the material from the medium, and wherein the generally conical shape of the first section of the first housing tapers outwardly along its length in a direction.

* * * * *

UNITED STATES PATENT AND TRADEMARK OFFICE
CERTIFICATE OF CORRECTION

| | | |
|---|---|---|
| PATENT NO. | : 8,813,973 B2 | Page 1 of 1 |
| APPLICATION NO. | : 12/435451 | |
| DATED | : August 26, 2014 | |
| INVENTOR(S) | : Chie Ying Lee et al. | |

It is certified that error appears in the above-identified patent and that said Letters Patent is hereby corrected as shown below:

In the Claims

Claim 29, column 24, lines 19-20, replace "length in a direction." with --length in a direction towards the second section.--

Signed and Sealed this
Third Day of March, 2015

Michelle K. Lee
*Deputy Director of the United States Patent and Trademark Office*